Patented Oct. 13, 1942

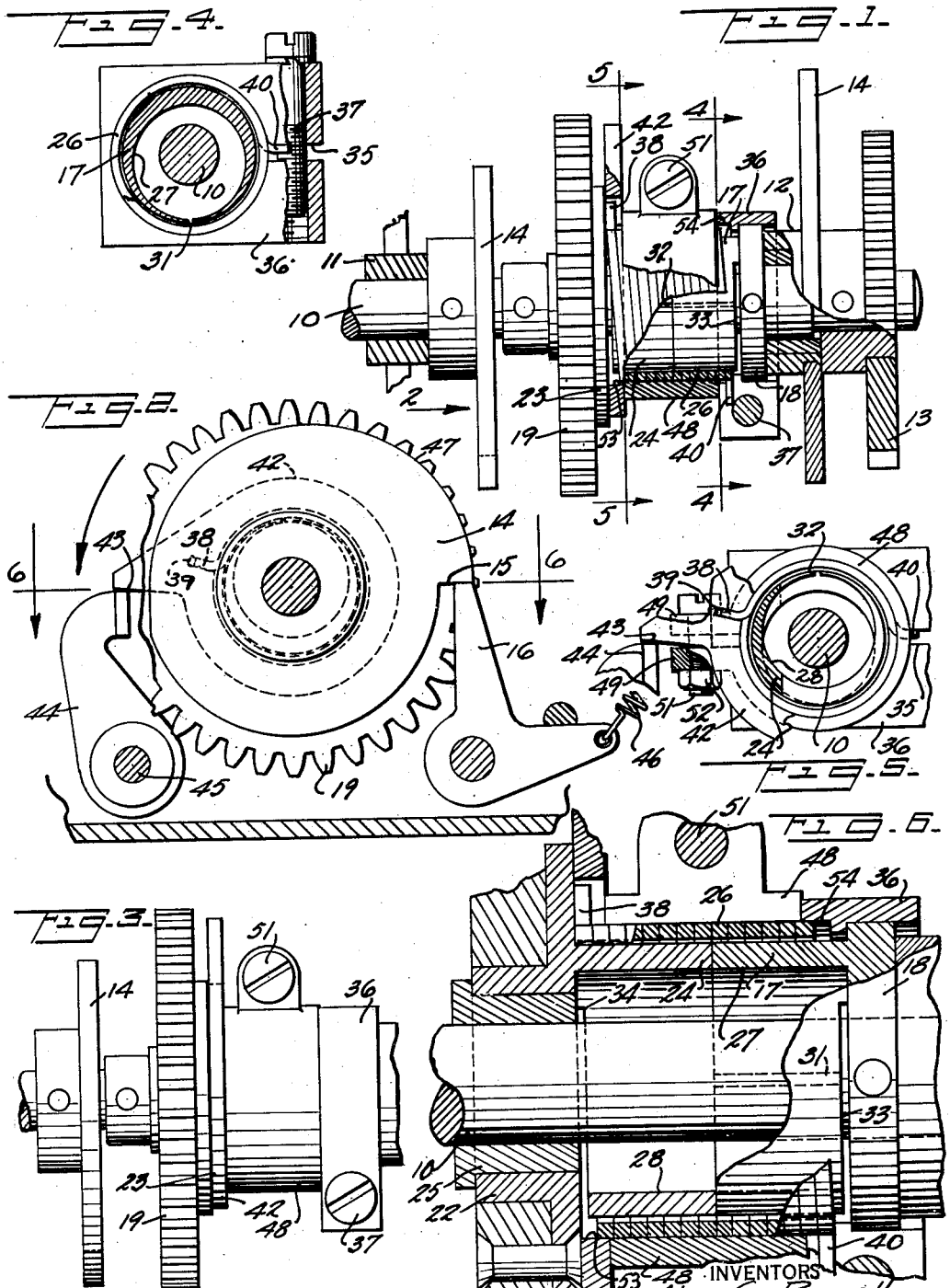

2,298,970

UNITED STATES PATENT OFFICE 2,298,970

SPRING CLUTCH

Alva G. Russell and Alfred Burckhardt, Stamford, and Samuel E. Calhoun, Springdale, Conn., assignors to Pitney-Bowes Postage Meter Co., Stamford, Conn., a corporation of Delaware Application March 1, 1941, Serial No. 381,238

6 Claims. (Cl. 192—33)

This invention relates to a spring clutch mechanism and more particularly to a one revolution spring clutch.

Spring clutch mechanisms have been used in various forms but invariably the principle which is followed is that of applying a spring clutching grip wholly to a driver member and depending upon the tail of the spring to take the entire torque load of the driven member.

In the spring clutch of this invention, the entire coil surface is brought into a frictional clutching action with both the driving and driven members.

By means of this invention a spring clutch mechanism is provided wherein the driving and driven members each comprise an arbor portion arranged end to end and about which a coil spring is wound. When driving is effected, the spring contracts to frictionally clutch each of said arbors, and under non-driving conditions the spring is adapted to be expanded to permit the driving arbor to rotate freely.

It is the principal object of the invention to provide a spring clutch mechanism wherein the coils of a coil spring are adapted to become clutched with both a driving and a driven member.

It is a further object to provide a spring clutch mechanism wherein part of the coils of a coil spring are adapted to become clutched with the driving member and the remaining coils are adapted to become clutched with the driven member.

It is a further object to provide a spring clutch mechanism which includes a driving and driven arbor each of the same diameter and having their ends abutting, which arbors are adapted to be clutched in driving relation by a coil wound thereabout.

It is a further object of this invention to provide a one revolution spring clutch mechanism which includes a driving and a driven arbor having their ends abutting and about which a spring is coiled, and wherein one end of the spring is anchored to the driven arbor and the opposite end is anchored to a clutch stop arm, which, when engaged by a clutch stop, will expand the spring to permit the free running of the driving arbor, and when the clutch stop is removed, will permit a normal contraction of the spring to effect a frictional grip between the spring and each of the arbors and thereby effect the drive of the driven arbor.

It is a further object to provide means for braking or snubbing the action of the expanding spring when the clutch stop arm reengages a clutch stop at the end of a revolution. It is a further object to provide means whereby each of the arbors is yieldable circumferentially to thereby permit maximum clutching engagement of the spring with the arbors.

With the above and other objects in view, which will appear as the description proceeds, the invention resides in the combination and arrangement of parts and in the details of construction hereinafter described and claimed, it being understood that various changes in the precise embodiment of the invention herein disclosed may be made within the scope of what is claimed without departing from the spirit of the invention.

A preferred embodiment of the invention is illustrated in the accompanying drawing, wherein;

Fig. 1 is a plan view of a spring clutch mechanism including a driving member and driven member, with parts broken away and parts shown in section, also showing the spring in a clutching position;

Fig. 2 is a front view taken in the direction of the arrow 2 of Fig. 1;

Fig. 3 is a partial plan view of the mechanism shown in Fig. 1, with the parts in a non-clutching position;

Fig. 4 is a vertical sectional view taken on the line 4—4 of Fig. 1 but with the spring in a non-clutching position;

Fig. 5 is a vertical sectional view taken along the line 5—5 of Fig. 1 with the spring in a non-clutching position; and Fig. 6 is an enlarged sectional plan view with parts broken away, showing a portion of the spring clutch mechanism with the spring in its normal non-clutching position.

Referring now to the drawing in detail, a shaft 10 is rotatably supported in bearings 11—12, which bearings are carried by a part of a machine frame structure. Secured to said shaft to rotate therewith is a gear 13, which will be referred to as the driven gear and which is adapted to effect the drive of other operating parts of the machine. Also fixed to said shaft is a disc 14 having a shoulder 15 which is adapted to cooperate with a backstop 16, Fig. 2, in a manner to be hereinafter described. A sleeve 17, having a flange 18 thereon, is also pinned to said shaft 10.

Freely movable about the shaft 10 is a driving gear 19. Said gear 19 has a bushing 22 therein with a flanged portion 23 riveted to the face of the gear 19, and a sleeve portion 24 extending from said flange, as best shown in Fig. 6. Another bushing 25, has a press fit within the bushing 22 and is adapted to rotate freely on the shaft 10 to thereby provide a bearing for the gear structure 19.

As best shown in Fig. 6, the sleeve portions 17 and 24 are of the same diameter and have their ends abutting, to thereby form a continuous arbor, and a coil spring 26 is mounted over said arbor.

Each of said sleeve or arbor portions 17 and 24 are preferably provided with eccentric bores 27 and 28 respectively, to provide an extremely thin and yieldable cross-section along one surface thereof. Longitudinal slots 31 and 32 are cut through each of the thin surfaces in said sleeves 17 and 24 respectively, and further, a slot 33 is cut in the sleeve 17 adjacent the flange 18, and a slot 34 is cut in the sleeve 24 adjacent the flange 23. As best viewed in Fig. 6, it will be noted that the latter slots 33 and 34 are cut more than three-fourths of the way through the sleeves to thus leave a restricted amount of stock to support the sleeves. By this means of slotting, the said sleeve portions are adapted to yield sufficiently to obtain a maximum gripping effect between said spring and sleeves when the spring 26 is in a clutching position.

The coil spring 26, which envelopes the two sleeve or arbor portions 17—24, has one end 40 anchored within a split portion 35 of a split collar 36, which collar is adapted to be clamped over the flange 18 by means of a screw 37. The opposite end 38 of the coil spring 26 is anchored in a slot 39, provided in a stop arm 42. Said stop arm 42 has a shoulder 43 and is mounted so as to rock freely about the spring 26, and further, the shoulder 43 is normally urged in a counterclockwise direction against a stop 44, as viewed from Figs. 2 and 5. The latter condition is the result of the structure and assembly of the spring 26, the normal inside diameter of which is less than the outside diameter of the sleeves or arbors 17—24, and which is expanded sufficiently when the shoulder 43 of the stop arm 42 engages the stop 44, to provide a free-running fit with relation to the driving arbor 24. The stop 44 is pivotally mounted upon a shaft 45 and is adapted to be controlled by any desired external source in such manner that, after it is withdrawn from the path of the shoulder 43, it is again returned into the path thereof before the clutch passes through one full revolution, thereby effecting a stop to limit the rotation of the clutch to one revolution.

Cooperating with the stop 44 is the backstop 16, which is normally maintained under spring tension by means of a spring 46. Said backstop is adapted to be moved out of the path of the shoulder 15 by means of a cam portion 47 during the rotation of the clutch, but is immediately returned at the end of the revolution by the spring 46. Counter-rotation or rebound of the clutch is thus checked.

In the clutching action, which is effected when the stop 44 is removed from the path of the shoulder 43, the spring which was expanded diametrically during the stop or non-clutching position, is adapted to contract in an effort to reach its normal inside diameter, which as previously stated is less than the diameter of the arbors. Each coil in contracting will therefore frictionally engage the said arbors, and owing to the direction the coils are wound with relation to the direction of rotation of the driving arbor, and the coefficient of friction between the spring and said arbor, the resulting effect will be to increase the frictional contact through the increased winding action. The immediate clutch action will start with the first coil of the spring on the driving arbor 24, but at the instant that the load is applied, that is, the drive of the arbor 17, the continued effect of the frictional driving force of the spring will produce its maximum driving torque in those coils positioned at either side of the juncture of the driving and driven arbors. The frictional driving torque of each succeeding coil at either side of the said juncture will be slightly but immeasurably less.

When the spring is in clutched engagement with the arbors, the coils immediately surrounding the line of arbor abutment will engage both the arbor 17 and the arbor 24, thus effecting an even distribution of the load in the spring and placing the driving force of the spring where it can serve as a driving medium most effectively.

In addition to the improved clutching qualities which result from the effect of the friction between the spring 26 and both arbors 17, 24, the yieldability of each arbor and the general refinement resulting from the eccentric bore and slotted portions, further enhance the gripping action of the spring to meet the unusual test which a one revolution clutch is required to meet.

While the above relates strictly to the clutching action, it is also important to provide means for reducing to a minimum, the shock which results at the termination of each revolution. For this purpose a yieldable sleeve 48 is provided, which is adapted to envelope the spring 26, and includes a split portion with ears 49—49 extending outwardly therefrom. A bolt 51 is adapted to be passed through one ear 49 and screwed within the other ear, and is locked in an adjusted position by means of a lock-nut 52.

Instead of being tightly clamped however, the said sleeve 48 is clamped to a snug fit around the spring 26 when the spring is in a non-clutching position. The sleeve, which has a normal inside diameter substantially equal to the outside diameter of the spring when contracted or in clutching position, will therefore contract with the spring when clutching is effected, thus leaving a space between the head of the screw 51 and the ear 49. When the clutch reaches the end of a revolution and the spring 26 is expanded in the manner previously described, the sleeve 48 will expand therewith to the limit of the space between the head of the screw 51 and ear 49, to thus provide a snubbing action. This snubbing action serves two particularly useful purposes, one to provide a reduction of the stopping noise, and the other to protect the spring against undue stress and strain which would result if the spring were allowed to expand without restriction during each stopping operation.

It will be noted from the drawing that in addition to the shielding of the coils of the spring by the sleeve 48, the coils which project beyond the left edge of the sleeve 48, as viewed in Fig. 6, are shielded within an opening 53 in the stop arm 42, and that the coils projecting beyond the opposite end of the sleeve are shielded within a recess 54 in the split collar 36. As a result of such shielding of the entire spring, there can be no concentration of strain at any single point on a coil or part thereof, and the spring will therefore function indefinitely.

From the foregoing, it will be seen that the spring clutch includes structure which results in a quickly responsive device during both the clutching and declutching actions and that such results are enhanced by such refinements as the yieldable arbors, the shielding of the spring including the anchored ends, the yieldable brake shield, etc.

While the above clutch structure is generally adapted for many applications, it is particularly adapted for use in a postage printing machine wherein the tripping of the clutch, and rotation of the drive shaft 10 and gear 13 will effect rotation of a rotary printing member. In such a machine it is important that the postage impression be printed consistently in the same location with relation to the upper left hand corner of each letter passed through the machine. It is obvious that unless there is absolute control to prevent slip, there could be no consistent printing in the same precise location on each letter. This absolute control is acquired with the above described device. Further, in setting the device after assembly, the two points of adjustment, one at the clamp screw 37 and the other at the bolt 51, provide the final refinements which set the desired tension and braking action of the spring respectively to accomplish the accuracy of printing that is desired.

Having described the invention, what is claimed is:

1. In a spring clutch mechanism, a coil spring, a driving member having a diametrically yieldable arbor portion extending within one end of the coil spring, a driven member having a diametrically yieldable arbor portion extending within the other end of the coil spring, and means to provide for the contraction of the spring diametrically, whereby the spring is adapted to become spirally wound around both the driving and driven yieldable arbor portions, with said arbors yielding sufficiently to effect a pressure opposing the spirally wound spring pressure to effect a positive clamping grip.

2. In a spring clutch mechanism, a coil spring, a driving member including a split sleeve portion extending within one end of the coil spring and adapted to freely rotate therein, a driven member including a split sleeve portion extending within the other end of the coil spring, and means to provide for the contraction of the spring diametrically, whereby the spring is adapted to become spirally wound around both the split sleeve portions of the driving and driven members, to effect an external pressure on the split sleeve and contract same within the limit of the split, and whereby the contracted sleeve is adapted to effect a counter clamping force against the inside of the spring.

3. In a spring clutch device, a coiled spring, a continuously rotating arbor extending within one end of said spring, a rotative but normally stationary arbor extending within the opposite end of said spring, each of said arbors comprising a shell having a longitudinal split through their peripheral surfaces, and an eccentric opening to provide the least stock at the position of the split, a stop arm, means to anchor the end of the first coil of the spring to stop arm, means to anchor the last coil of the spring to the normally stationary arbor, said spring having a normal inside diameter which is less than the outside diameters of the shell arbors therein, and a stop normally engaged by the stop arm, whereby the coils are expanded diametrically to permit the free rotation of the rotating arbor and whereby, when the stop is removed from the stop arm, the coils upon returning to their normal diameters will clutch the split shells of the arbors to effect contraction of the shells and consequently effect a firm non-slipable grip for the drive of the stationary arbor.

4. In a spring clutch device, a coiled spring, a continuously rotating arbor extending within one end of said spring, a rotative but normally stationary arbor extending within the opposite end of said spring, each of said arbors comprising a flanged shell having a longitudinal split through their peripheral surfaces and a transverse slot part way through the sleeves adjacent the flanges to thereby provide contractible arbors, a stop arm, means to anchor the end of the first coil of the spring to the stop arm, means to anchor the last coil of the spring to the normally stationary arbor, said spring having a normal inside diameter which is less than the outside diameters of the shell arbors therein, and a stop normally engaged by the stop arm, whereby the coils are expanded diametrically to permit the free rotation of the rotating arbor and whereby, when the stop is removed from the stop arm, the coils upon returning to their normal diameters will clutch the split shell portions to effect contraction of the shells and consequently effect a firm non-slipping grip for the drive of the stationary arbor.

5. In a spring clutch mechanism, a coil spring, a driving member, a driven member, means whereby the driving member may normally run free with relation to the coil spring, means whereby the coil spring may have its coils clutched with both driving and driven members when a drive of the driven member is to be effected, and yieldable shielding means enveloping the coil structure of the spring whereby the expansion of the spring during declutching is snubbed and noise is reduced.

6. In a spring clutch mechanism, a coil spring, a driving member, a driven member, means whereby the driving member may normally run free with relation to the coil spring, means whereby the coil spring may have its coils clutched with both driving and driven members when a drive of the driven member is to be effected, yieldable shielding means including a split sleeve enveloping the coil, whereby the expansion of the spring during declutching is snubbed, and means to limit the yieldability of the sleeve.

ALVA G. RUSSELL.
ALFRED BURCKHARDT.
SAMUEL E. CALHOUN.